US009318805B2

(12) United States Patent
Jia

(10) Patent No.: US 9,318,805 B2
(45) Date of Patent: Apr. 19, 2016

(54) UPDATING A BEAM PATTERN TABLE

(75) Inventor: Zhanfeng Jia, Belmont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 227 days.

(21) Appl. No.: 13/590,752

(22) Filed: Aug. 21, 2012

(65) Prior Publication Data

US 2014/0055302 A1  Feb. 27, 2014

(51) Int. Cl.
| | |
|---|---|
| H01Q 3/34 | (2006.01) |
| H01Q 3/26 | (2006.01) |
| H04B 7/04 | (2006.01) |
| H04B 7/06 | (2006.01) |
| H04L 1/00 | (2006.01) |
| H04W 16/28 | (2009.01) |
| H04W 24/02 | (2009.01) |
| H04W 24/04 | (2009.01) |
| H04W 72/04 | (2009.01) |
| H04B 17/24 | (2015.01) |
| H04B 17/318 | (2015.01) |

(52) U.S. Cl.
CPC . *H01Q 3/34* (2013.01); *H01Q 3/26* (2013.01); *H01Q 3/2605* (2013.01); *H04B 7/0408* (2013.01); *H04B 7/0621* (2013.01); *H04B 7/0632* (2013.01); *H04B 7/0695* (2013.01); *H04B 17/24* (2015.01); *H04B 17/318* (2015.01); *H04L 1/0026* (2013.01); *H04W 16/28* (2013.01); *H04W 24/02* (2013.01); *H04W 24/04* (2013.01); *H04W 72/046* (2013.01)

(58) Field of Classification Search
USPC .............................. 455/6.11, 575.7; 370/338
See application file for complete search history.

(56) References Cited

U.S. PATENT DOCUMENTS

| | | | |
|---|---|---|---|
| 8,005,303 | B2 | 8/2011 | Cote |
| 2002/0168946 | A1* | 11/2002 | Aizawa et al. .................. 455/82 |
| 2004/0259597 | A1* | 12/2004 | Gothard et al. ............ 455/562.1 |
| 2005/0200524 | A1* | 9/2005 | Grandhi et al. ............... 342/374 |
| 2005/0202859 | A1* | 9/2005 | Johnson et al. ............ 455/575.7 |
| 2006/0233131 | A1 | 10/2006 | Gore et al. |
| 2007/0021069 | A1* | 1/2007 | Abramov et al. ............ 455/63.4 |
| 2008/0247370 | A1* | 10/2008 | Gu et al. ....................... 370/338 |

(Continued)

FOREIGN PATENT DOCUMENTS

| | | |
|---|---|---|
| EP | 2320576 A2 | 5/2011 |
| WO | WO-2004042959 A1 | 5/2004 |
| WO | WO-2009102124 A2 | 8/2009 |

OTHER PUBLICATIONS

International Search Report and Written Opinion—PCT/US2013/055835—ISA/EPO—Nov. 8, 2013.
IEEE P802.11ad/D5.0, Sep. 2011, Draft Standard for Information Technology—Telecommunications and Information Exchange Between Systems—Local and Metropolitan Area Network—Specific Requirements—Part 11: Wireless LAN Medium Access Control (MAC) and Physical Layer (PHY) Specifications—Amendment 3: Enhancements for Very High Throughput in the 60 GHz Band, 601 pages.

*Primary Examiner* — Junpeng Chen
(74) *Attorney, Agent, or Firm* — Dang M. Vo

(57) ABSTRACT

An apparatus that employs a directional antenna system updates a beam pattern table that includes entries corresponding to each of the other apparatuses with which the apparatus communicates. For example, for each of the other apparatuses, the beam pattern table may specify the antenna weights to be used to provide a quasi-omni-directional beam pattern, a sector level beam pattern, and a refined beam pattern when communicating with that other apparatus. In some aspects, the beam pattern table includes one or more characteristics associated with each of the beam patterns. These characteristics may be used in conjunction with a beam search criterion to trigger updating of the beam pattern table.

31 Claims, 12 Drawing Sheets

(56) References Cited

U.S. PATENT DOCUMENTS

| | | |
|---|---|---|
| 2009/0298502 A1 | 12/2009 | Hagerman et al. |
| 2010/0075705 A1* | 3/2010 | van Rensburg et al. ...... 455/509 |
| 2010/0210219 A1 | 8/2010 | Stirling-Gallacher et al. |
| 2011/0026418 A1 | 2/2011 | Bollea et al. |

* cited by examiner

BEAM PATTERN TABLE

| | | QUASI-OMNI-DIRECTIONAL BEAM SELECTION | SECTOR BEAM SELECTION | SECTOR BEAM TIMESTAMP | SECTOR BEAM SIGNAL QUALITY | REFINED BEAM SELECTION | REFINED BEAM TIMESTAMP | REFINED BEAM SIGNAL QUALITY |
|---|---|---|---|---|---|---|---|---|
| STA 1 | TX | Q | S1 | T1 | SQ1 | R33 | T6 | SQ6 |
| | RX | Q | S3 | T2 | SQ2 | R17 | T7 | SQ7 |
| STA 2 | TX | Q | S6 | T3 | SQ3 | R4 | T8 | SQ8 |
| | RX | Q | S12 | T4 | SQ4 | - | - | - |
| ... | | | | | | | | |
| STA N | TX | Q | S9 | T5 | SQ5 | R40 | T9 | SQ9 |
| | RX | Q | - | - | - | - | - | - |

UPDATING A BEAM PATTERN TABLE

BACKGROUND

Field

This application relates generally to wireless communication and more specifically, but not exclusively, to updating a beam pattern table.

Introduction

Some wireless communication apparatuses (e.g., devices) employ directional antenna systems to improve antenna gain. To provide this directionality, the signals that drive the different antennas of the antenna system are weighted differently (e.g., in terms of signal phase and, optionally, amplitude).

IEEE 802.11ad is directed to wireless communication in the 60 GHz frequency range. Due to the high propagation losses at these frequencies, directional antenna systems are supported by this standard to improve antenna gain and thereby improve communication performance. Specifically, the antennas for each 802.11ad apparatus may be configured to support a quasi-omni-directional beam pattern, a sector level beam pattern, or a refined beam pattern (i.e., a narrower beam than a sector level beam). To provide these different beam patterns, an appropriate antenna weight taken from a set of antenna weights (e.g., a set comprising: $\{1, -1, j, -j\}$) is assigned to each antenna. For the case of the set $\{1, -1, j, -j\}$, for a given antenna, the amplitude is always "1" and the phase is one of 0°, 90°, 180°, and 270°.

When apparatuses employ directional antenna systems for beamformed communication, there is a need to address operating conditions that may affect the ability of the apparatuses to communicate with one another via a beamformed link. For example, if one or more of the apparatuses is moved, the beam used by a given apparatus may no longer be directed toward the other apparatus. In addition, if an external object ends up within a beam (e.g., due to movement of the object and/or an apparatus), the object may block the beam.

SUMMARY

A summary of several sample aspects of the disclosure follows. This summary is provided for the convenience of the reader and does not wholly define the breadth of the disclosure. For convenience, the term some aspects is used herein to refer to a single aspect or multiple aspects of the disclosure.

The disclosure relates in some aspects to adaptive beam tracking for apparatuses that employ directional antenna systems. Each apparatus maintains a beam weight data structure (hereafter referred to as a beam pattern table) that includes entries corresponding to each of the other apparatuses with which the apparatus communicates. For example, for each of the other apparatuses, the beam pattern table may specify the antenna weights to be used to provide a quasi-omni-directional beam pattern, a sector level beam pattern, and a refined beam pattern when communicating with that other apparatus. Typically, different sets of antenna weights are specified for transmit and receive operations.

In some aspects, the beam pattern table includes one or more characteristics associated with each of the beam patterns. For example, the beam pattern table may include a timestamp that indicates, for example, when a given set of antenna weights was selected. As another example, the beam pattern table may include an indication of signal quality associated with data transmission using a given set of antenna weights.

These characteristics may be used in conjunction with a beam search criterion to trigger updating of the beam pattern table. For example, to accommodate changes in operating conditions, each apparatus may monitor at least one beam search criterion to determine whether to invoke a search for a different beam pattern. If a better beam pattern is identified by the search, the apparatus will update its beam pattern table and switch to the new beam pattern. Consequently, the apparatus may be able to maintain a high level of communication performance (e.g., through the user of a more robust modulation and coding scheme and higher signaling rates).

In some implementations, a beam search criterion relates to signal quality at a receiving apparatus. For example, a second apparatus may send back information indicative of the signal quality (e.g., received signal strength, signal-to-noise ratio, etc.) associated with a data frame received from a first apparatus. If the signal quality drops below a threshold value (e.g., a beam search signal quality threshold), the first apparatus may invoke a search for a new beam pattern.

In some implementations, a beam search criterion relates to timing information associated with a set of antenna weights from the beam pattern table. For example, if the antenna weights have not been updated for a defined period of time (e.g., a beam search time threshold), an apparatus may invoke a search for a new beam pattern.

In some implementations, a search involves a first apparatus sending a data frame to a second apparatus where the data frame includes training fields that are sent using different beam patterns. The second apparatus then provides feedback to the first apparatus indicative of the signal quality associated with each training field. The first apparatus may then select the best beam pattern based on the fed-back signal quality information.

In view of the above, in some aspects, wireless communication in accordance with the teachings herein involves: monitoring at least one characteristic associated with use of a first beam pattern specified for beamformed communication by a beam pattern table; conducting a beam pattern search as a result of the monitoring, wherein the beam pattern search comprises successively communicating using different beam patterns; identifying, as a result of the beam pattern search, one of the different beam patterns that is associated with highest signal quality; and updating the beam pattern table to specify the identified beam pattern for subsequent beamformed communication instead of the first beam pattern.

BRIEF DESCRIPTION OF THE DRAWINGS

These and other sample aspects of the disclosure will be described in the detailed description and the claims that follow, and in the accompanying drawings, wherein:

FIG. 5 is a simplified diagram illustrating an example of beamformed communication between wireless stations;

Figure 1:
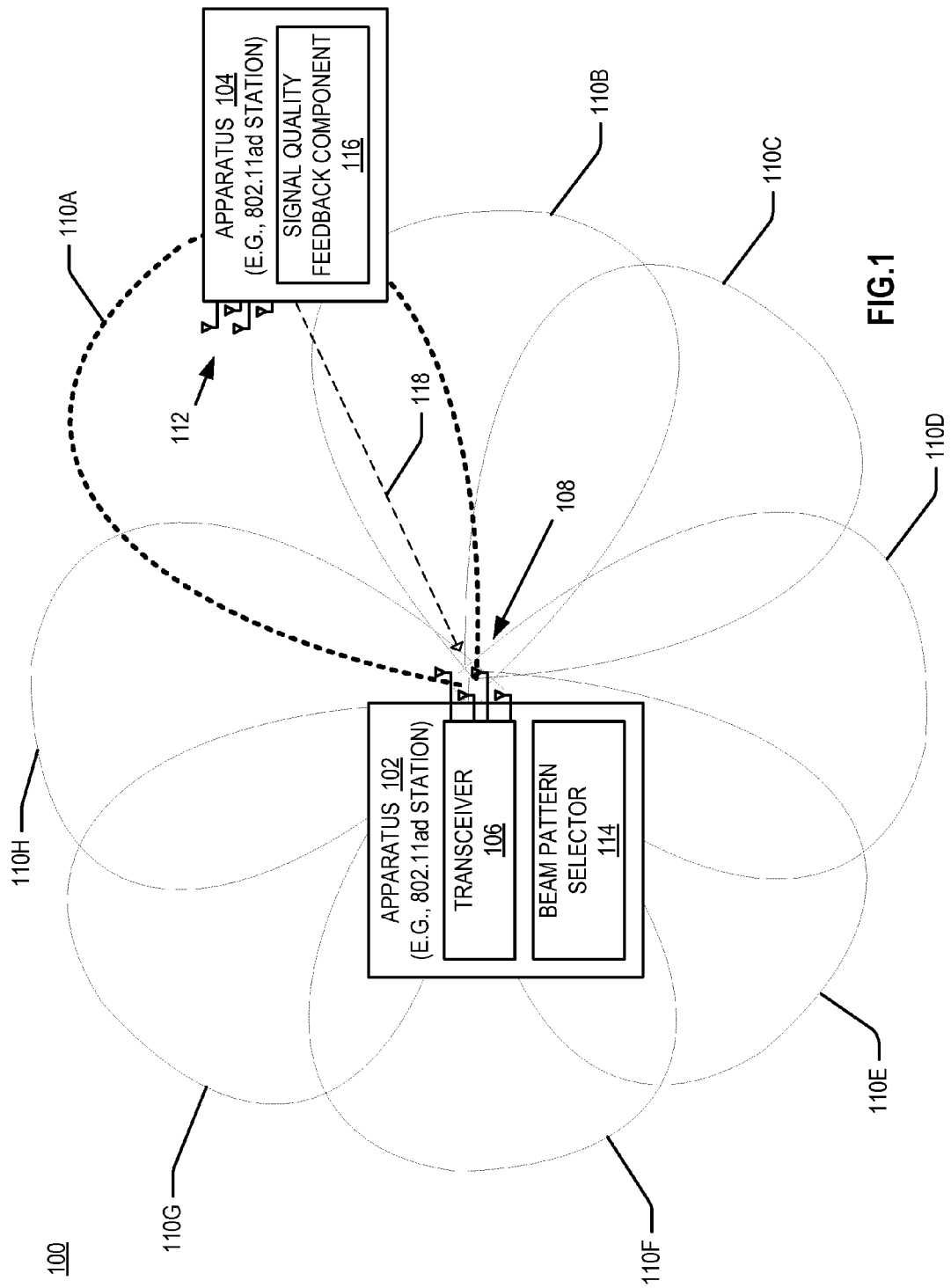
FIG. 1 is a simplified block diagram of several sample aspects of a communication system comprising apparatuses that employ beamformed communication.

In accordance with common practice, the features illustrated in the drawings are simplified for clarity and are generally not drawn to scale. That is, the dimensions and spacing of these features are expanded or reduced for clarity in most cases. In addition, for purposes of illustration, the drawings generally do not depict all of the components that are typically employed in a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim. As an example of the above, in some aspects, an apparatus comprises: a processing system configured to monitor at least one characteristic associated with use of a first beam pattern specified for beamformed communication by a beam pattern table; and a transceiver configured to conduct a beam pattern search as a result of the monitoring, wherein the beam pattern search comprises successively communicating using different beam patterns; wherein the processing system is further configured to: identify, as a result of the beam pattern search, one of the different beam patterns that is associated with highest signal quality, and update the beam pattern table to specify the identified beam pattern for subsequent beamformed communication instead of the first beam pattern. In addition, in some aspects, the at least one characteristic comprises received signal quality information associated with signal transmissions that are beamformed according to the first beam pattern.

FIG. 1 illustrates sample aspects of a communication system 100 where an apparatus 102 communicates with an apparatus 104 and, optionally, other apparatuses (not shown). The apparatus 102 includes a transceiver 106 that cooperates with an antenna system 108 (e.g., an antenna array) to generate directional beam patterns to provide higher gain for high frequency signaling (e.g., 60 GHz band). Examples of directional beam patterns 110A-110H that the apparatus 102 may generate are represented in a simplified form in FIG. 1 by the corresponding dashed line symbols. In practice, the apparatus 102 will generally use different beam patterns for signal transmission versus signal reception. Only one set of beam patterns is shown, however, to reduce the complexity of FIG. 1.

The apparatus 104 may include a similar transceiver (not shown) and antenna system 112 to generate directional beam patterns. To reduce the complexity of FIG. 1, the beams patterns for the apparatus 104 are not shown. In some implementations, the apparatuses comprise IEEE 802.12ad stations. It should be appreciated, however, that the teachings herein may be applied to other types of communication technologies.

In general, to close the link budget for communication between the apparatuses 102 and 104 and to achieve the best possible signal quality for this communication, the apparatuses 102 and 104 each select the beam pattern (for either a transmit or receive operation) that provides the best directionality with respect to the other apparatus. In the simplified example of FIG. 1, the apparatus 102 selects the beam pattern 110A to communicate with the apparatus 104.

In accordance with the teachings herein, the apparatus 102 includes a beam pattern selector 114 that selects the appropriate beam pattern to be used for communication with another apparatus (e.g., the apparatus 104). In some aspects, the selection of a beam pattern may be based on the relative signal qualities associated with the different beam patterns. To this end, the apparatus 104 includes a signal quality feedback component 116 that sends an indication (as represented by a dashed line 118) of the received signal quality of a beamformed signal (e.g., comprising data) received by the apparatus 104 from the apparatus 102.

A brief example of a beam pattern selection operation follows. The apparatus 102 may attempt to communicate with the apparatus 104 using each of the beam patterns 110A-110H. In some cases (e.g., for beam patterns 110C-110H), communication may fail (e.g., the link budget cannot be closed). In other cases, (e.g., for beam pattern 110A and perhaps beam pattern 110B), communication may be established with varying degrees of signal quality. Accordingly, the beam pattern selector 114 may maintain an indication of the signal quality (e.g., an indication of received signal strength) associated with each beam pattern 110A-110H when communicating (or attempting to communicate) with the apparatus 104. Based on this information, the beam pattern selector 114 may select the beam pattern associated with the highest signal quality.

To enable the apparatus 104 to perform similar operations, the apparatus 104 may include a beam pattern selector and the apparatus 102 may include a signal quality feedback component. To reduce the complexity of FIG. 1, however, these components are not shown.

In the example of FIG. 1, the apparatuses 102 and 104 each employ four antennas and eight different beam patterns are shown for the apparatus 102. It should be appreciated that the teachings herein are applicable to other implementations that include a different number of antennas, a different number of apparatuses, and a different number of beam patterns.

The antenna systems 108 and 112 may employ various types of antenna designs to achieve a directional beam pattern. An antenna array is but one example of such a design. An antenna array is a group of simple antenna elements such that signals running through them are of different amplitudes and phases. These amplitudes and phases are called antenna weights, and the set of the antenna weights is called the antenna weight vector (AWV).

In a simplified model, each antenna element in an antenna array is an isotropic radiator. This implies that each antenna element by itself is an antenna of isotropic pattern, also known as omni-directional pattern. A further simplification assumes that antenna weights all have the same amplitude and a limited number of phases. For example, all antenna weights may take values from the set of $\{1, -1, j, -j\}$. Such a restriction enables an antenna array configuration to be accomplished using 2 bits per antenna element.

Each antenna pattern corresponds to a beam, which is in turn realized by an AWV. Antenna pattern selection is usually a tradeoff between antenna gain and beam width. The higher the gain, the narrower the antenna array has to concentrate its energy radiation, thus the narrower the beam. Several examples of antenna patterns are described below.

Figure 2:
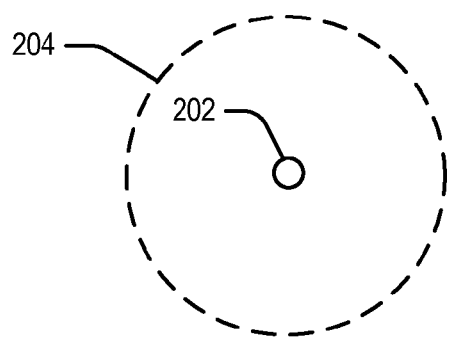
FIG. 2 is a simplified diagram illustrating an example of a quasi-omni-directional beam pattern.

FIG. 2 illustrates a simplified example of an omni-directional pattern 204 generated by an apparatus 202. Ideally, an isotropic radiator would generate a true omni-directional pattern. In practice, however, a perfect omni-directional pattern is not achievable. Thus, this pattern will be referred to herein as a quasi-omni-directional pattern.

Figure 3:
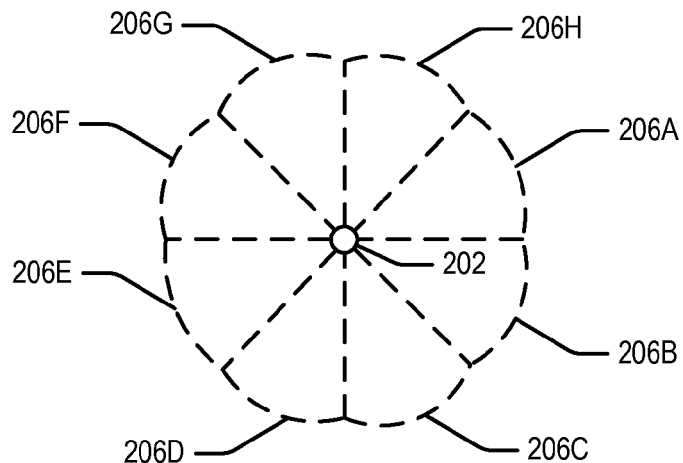
FIG. 3 is a simplified diagram illustrating an example of sector beam patterns.

FIG. 3 illustrates a simplified example of sector level beam patterns 206A-206H generated by the apparatus 202. The nominal width of a sector level beam is narrower than the quasi-omni-directional pattern but wider than a refined beam (discussed below). As discussed in more detail below, an apparatus may perform a sector level sweep based on a defined set of sector level beams to establish and/or improve communication with another apparatus.

Figure 4:
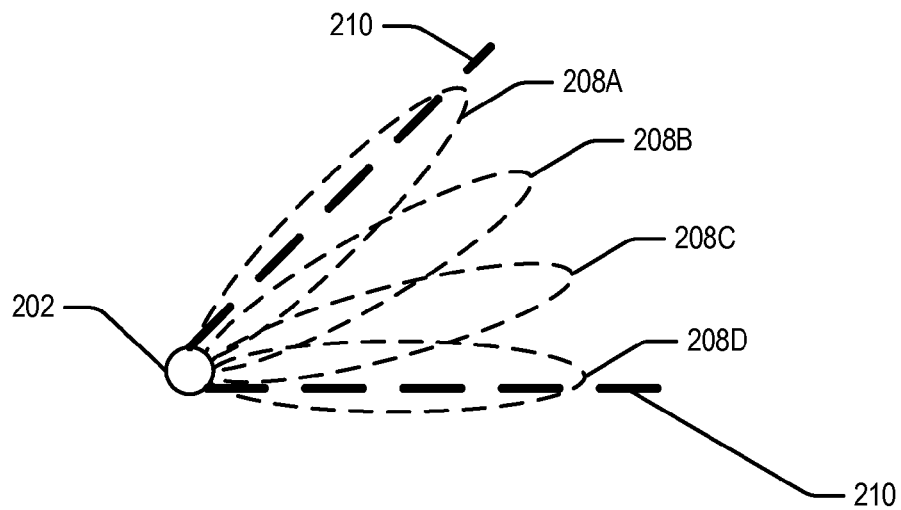
FIG. 4 is a simplified diagram illustrating an example of refined beam patterns.

FIG. 4 illustrates a simplified example of refined beam patterns 208A-208D generated by the apparatus 202. For perspective, the dashed lines 210 illustrate the nominal width of a sample sector level beam. Accordingly, it may be seen that the nominal width of a refined beam is narrower than the nominal width of the sector level beam. In some aspects, an apparatus may prove more refined beam selection by using a narrower refined beam to achieve higher gain.

A beamforming protocol may be employed to enable an apparatus to select proper beams for data exchanges with another apparatus. IEEE 802.11ad defines a sector level sweep (SLS) protocol and a beam refinement protocol (BRP) for beam selection. A sector level beam may be selected using either the SLS protocol or the BRP protocol. A refined beam may be selected using the BRP protocol. The quasi-omni pattern is unique across all peer apparatuses. Consequently, a protocol need not be used to select this pattern for a given apparatus. Also, beam selection for sector level and refined beam hierarchies may be deemed as "not available" if the corresponding beamforming protocol has not succeeded.

In accordance with the teachings herein, an apparatus may track a beamformed link with respect to a peer apparatus to mitigate degradation associated with the selected beam that may occur over time. Such beam degradation may, for example, be due to a change in the relative orientation of the apparatuses and/or due to blocking.

A change in apparatus orientation may cause a selected beam to point in a different direction (e.g., away from the peer apparatus). In practice, this condition may affect refined beams more than sector level beams, since refined beams usually have narrower beam width. Degradation caused by a change in apparatus orientation may be moderate in some cases. Here, the refined beam may still be usable, but with a reduced data rate. In other cases, however, degradation may be severe. In these cases, the refined beam may be unusable. However, the sector level beam may still be usable.

Blocking may occur when an object is present in the beam path between two apparatuses. Typically, blocking is manifested by a sudden change in the selected beam. In some cases, the original beam may be completely lost. Consequently, another beam that points in another direction may need to be selected to maintain communication between the apparatuses (even though the alternate beam may provide worse signal quality than the original beam).

The disclosure relates in some aspects to adaptive beam tracking that employs a beam pattern table (which also may be referred to as a beam selection table). Such a scheme may, for example, facilitate maintaining continuous data exchanges between apparatuses even in the face of changes in relative orientations of the apparatuses.

In some aspects, an apparatus maintains a beam pattern table for each apparatus (e.g., peer apparatus) with which the apparatus intends to communicate. In some implementations, the table includes beam selection entries for each of the three AWV hierarchies for the quasi-omni-directional pattern, sector level beams, and refined beams. In some implementations, the table includes a signal quality indicator for each AWV selection (e.g., indicative of signal quality that was observed when using that AWV). Also, in some implementations, the table includes a timing (e.g., freshness) indicator for each AWV selection. For example, a timestamp may indicate when the AWV was last updated and/or when the signal quality indicator was last updated.

FIG. 5 illustrates an example of a beam pattern table 500. A table corresponding to table 500 is maintained in (or for) each apparatus that employs the techniques taught herein for maintaining (e.g., updating) beamforming-related parameters. It should be appreciated that such a table may take other forms in accordance with the teachings herein.

The table 500 for a given apparatus (hereafter referred to a station) includes entries for each of a plurality of stations (STA 1, STA 2, . . . , STA N) with which the station has communicated and/or will communicate. In this example, different table entries are specified for transmit (TX) operations and receive (RX) operations. In some implementations, the table 500 comprises different entries (e.g., beam pattern weights, etc.) associated with different IEEE 802.11ad stations.

The table 500 includes entries for three different types of beam patterns. The first column includes entries for quasi-omni-directional "beam" selection. The second through fourth columns include entries for sector level beam selection. The fifth through seventh columns include entries for refined beam selection.

In the example of FIG. 5, a single AWV (designated Q) is specified for all quasi-omni-directional "beams." For example, a single antenna may be designated for all quasi-omni-directional transmissions and receptions.

For sector beam selection, different AWVs (designated S1, S3, S6, S12, and S9) are specified for the different stations, if applicable. For example, based on the procedures described below or other suitable procedures, the AWV from a set of AWVs defined for the station (e.g., S1-S16) that results in the best signal quality for sector beam communication between the station that maintains the table 500 and a given peer station (e.g., STA 1, STA 2, etc.) is identified and stored in the table 500. Typically, the AWV will indicate the antennas that are used (e.g., four out of eight antennas) and the phase to be used for each antenna (e.g., 1, −1, j, −j). An AWV may include other information (e.g., amplitude for each antenna) in other cases.

The sector beam timestamp column includes entries (designated T1, T2, T3, T4, and T5) that indicate, for example, when the corresponding sector beam AWV was updated (or added) to the table 500 and/or when the sector beam signal quality information was last updated. As discussed herein, these entries may be used to determine whether the corresponding AWV and/or signal quality information is too old and needs to be re-checked.

The sector beam signal quality column includes entries (designated SQ1, SQ2, SQ3, SQ4, and SQ5) that indicate, for example, the signal quality that was observed when using the corresponding sector beam AWV to communicate with the corresponding peer station. As discussed herein, these entries may be used to determine whether the corresponding AWV should be updated (e.g., due to another AWV providing better signal quality).

For refined beam selection, different AWVs (designated R33, R17, R4, and R40) are specified for the different stations, if applicable. For example, based on the procedures described below or other suitable procedures, the AWV from a set of AWVs defined for the station (e.g., R1-R64) that results in the best signal quality for refined beam communication between the station that maintains the table 500 and a given peer station (e.g., STA 1, STA 2, etc.) is identified and stored in the table 500. Again, the AWV will indicate the antennas that are used (e.g., eight out of eight antennas), the phase to be used for each antenna (e.g., 1, −1, j, −j), and any other suitable information (e.g., amplitude).

The refined beam timestamp column includes entries (designated T6, T7, T8, and T9) that indicate, for example, when the corresponding refined beam AWV was updated (or added) to the table 500 and/or when the refined beam signal quality information was last updated. Thus, these entries may be used to determine whether the corresponding AWV and/or signal quality information is too old and needs to be re-checked.

The refined beam signal quality column includes entries (designated SQ6, SQ7, SQ8, and SQ9) that indicate, for example, the signal quality that was observed when using the corresponding refined beam AWV to communicate with the corresponding peer station. These entries may be used to determine whether the corresponding AWV should be updated (e.g., due to another AWV providing better signal quality).

As mentioned above, in some cases, an apparatus may be unable to establish communication using a sector level beam or a refined beam. In such cases, the table 500 may not have any entries for the corresponding sections of the table. In the example of FIG. 5, the apparatus was only able to receive from STA N using a quasi-omni-directional "beam." In addition, the apparatus was not able to receive from STA 2 using a refined beam.

Figure 6:
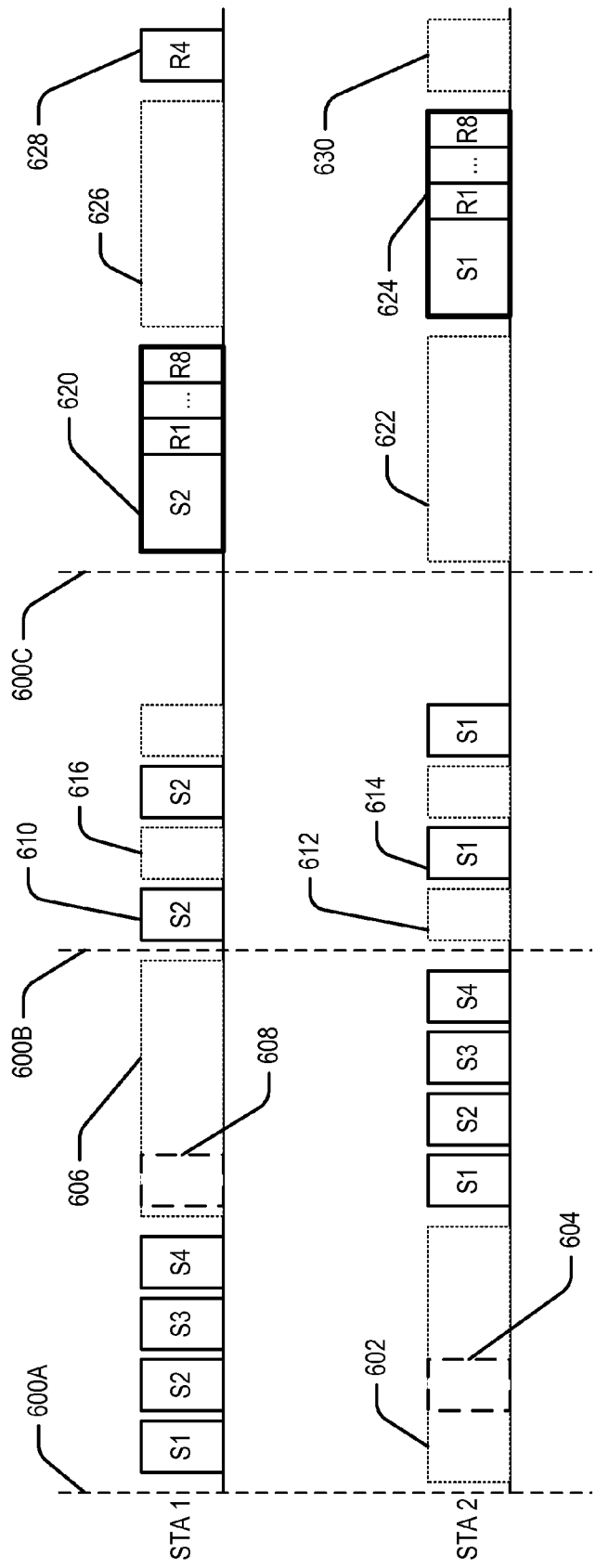
FIG. 6 is a simplified diagram illustrating an example of a beam pattern table.

FIG. 6 illustrates an example of signaling that may be used to select initial entries for and update the entries of a beam pattern table. For purposes of illustration, this signaling is described as being between a pair of peer stations STA 1 and STA 2, each employing four sector beams and eight refined beams. It should be appreciated, however, that this signaling may be employed for different types of apparatuses and using different numbers of sector beams and refined beams.

The signaling between the vertical dashed lines 600A and 600B represents an example of a sector sweep that may be performed by the stations STA 1 and STA 2. At designated times, the station STA 1 transmits using each of its sector beams (S1, S2, S3, and S4) in succession. During this time, the station STA 2 receives using a quasi-omni-directional antenna configuration as represented by the dashed box 602. As represented by the dashed box 604, the station STA 2 successfully receives the sector beam S2 transmission from the station STA 1.

The station STA 2 then transmits using each of its sector beams (S1, S2, S3, and S4) in succession. During this time, the station STA 1 receives using a quasi-omni-directional antenna configuration as represented by the dashed box 606. As represented by the dashed box 608, the station STA 1 successfully receives the sector beam S1 transmission from the station STA 2. Of note, the sector beams associated with the different stations are typically not coordinated. That is the sector beam S1 of the station STA 1 may be directed in an entirely different direction than the sector beam S1 of the station STA 2.

Upon successfully receiving a sector beam from another station, the receiving station will send an indication of such to the transmitting station. For example, the station STA 2 may indicate in each of the transmissions for its sector beams S1, S2, S3, and S4 that the STA 2 successfully received the sector beam S2 transmission from the station STA 1. Consequently, the station STA 1 will update its beam pattern table to use the sector beam S2 for subsequent transmissions to the station STA 2. Similarly, the station STA 1 may indicate in a subsequent transmission (e.g., a sector beam S2 transmission represented by a block 610) that the STA 1 successfully received the sector beam S1 transmission from the station STA 2. Consequently, the station STA 2 will update its beam pattern table to use the sector beam S1 for subsequent transmissions to the station STA 1.

Note that a given station may not know the specific sector being used by another station at a given point in time. Hence, the indications of sector beams discussed above may in fact simply indicate when a transmission was successfully received (e.g., a counter value may be sent, where each count corresponds to an expected transmission time for a different one of the sectors).

The signaling between the vertical dashed lines 600B and 600C represents sample sector level communications between the stations STA 1 and STA 2. For example, the station STA 1 will send subsequent transmissions via its sector beam S2 (e.g., as represented by the block 610) and the station STA 2 will receive that transmission (e.g., as represented by a dashed block 612). Similarly, the station STA 2 will send subsequent transmissions via its sector beam S1 (e.g., as represented by the block 614) and the station STA 1 will receive that transmission (e.g., as represented by a dashed block 616).

Further to the above, the stations STA 1 and STA 2 may perform similar operations to refine their beam pattern tables for receive operations. For example, a given station may perform a test that successively switches between different AWVs while receiving from another station to identify the beam pattern that provides the best results. The station will then update its beam pattern table to use the identified AWV for subsequent receive operation from that other station.

The signaling after the vertical dashed line 600C represents refined beam selection operations performed by the stations STA 1 and STA 2. In this case, each station sends a series of transmissions using different refined beams. For example, a station may send a frame that includes training fields, where the station uses a different refined beam to transmit each successive training field. In the example of FIG. 6, the station STA 1 transmits a frame 620 that includes a message (e.g., indicating that a refined beam search is being performed) transmitted using its sector beam S2 along with eight training fields (transmitted using refined beams R1-R8). The station STA 2 receives this frame as indicated by the dashed box 622. Similarly, the station STA 2 transmits a frame 624 that includes a message (e.g., indicating that a refined beam search is being performed) transmitted using its beam sector S1 along with eight training fields (transmitted using refined beams R1-R8). The station STA 1 receives this frame as indicated by the dashed box 626.

Upon receiving a refined beam from another station, the receiving station will send an indication of such to the transmitting station. For example, the station STA 2 may indicate in a message of the frame 624 that the refined beam R4 transmission is the best from the perspective of the STA 2 (e.g., by indicating the signal quality of each refined beam transmission). Consequently, the station STA 1 will update its beam pattern table to use the refined beam R4 for subsequent transmissions to the station STA 2. Similarly, the station STA 1 may indicate in a subsequent transmission (e.g., a refined beam R4 transmission represented by a block 628) that the refined beam R7 transmission is the best from the perspective of the STA 1 (e.g., by indicating the signal quality of each refined beam transmission). Consequently, upon receiving this information (e.g., as represented by a dashed box 630), the station STA 2 will update its beam pattern table to use the refined beam R7 for subsequent transmissions to the station STA 1.

In some implementations, a station may provide feedback information (e.g., signal quality indication) via an acknowledgement (ACK) frame. For example, upon receipt of a data frame from a first station, a second station may determine a signal quality indication associated with that data frame and include that indication in an ACK frame that the second station then transmits to the first station.

With the above in mind, sample adaptive beam tracking operations that may be performed by an apparatus will be described in more detail with reference to the flowcharts of FIGS. 7-11. For purposes of illustration, the operations of FIGS. 7-11 (or any other operations discussed or taught herein) may be described as being performed by specific components. These operations may be performed by other types of components and may be performed using a different number of components in other implementations. Also, it should be appreciated that one or more of the operations described herein may not be employed in a given implementation. For example, one entity may perform a subset of the operations and pass the result of those operations to another entity.

Figure 7:
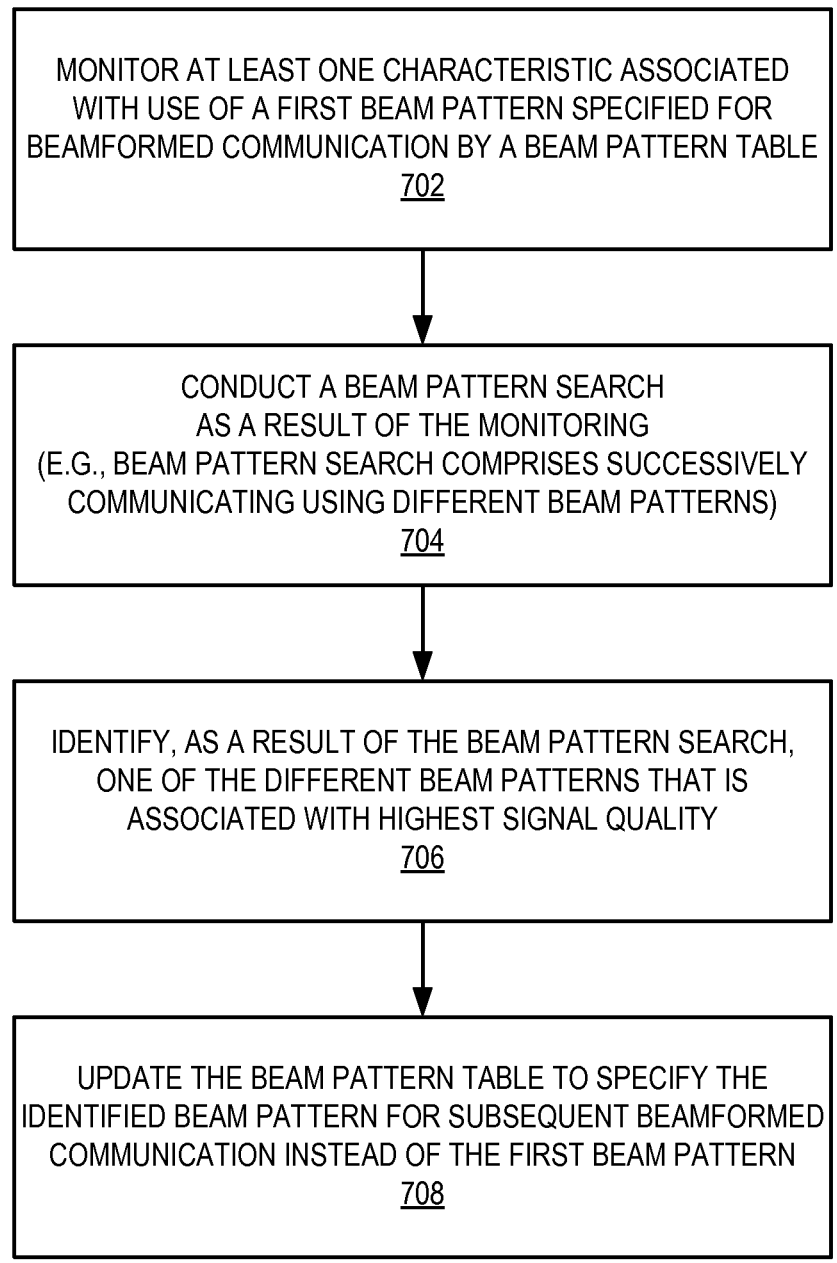
FIG. 7 is a flowchart of several sample aspects of operations performed in conjunction with updating a beam pattern table.

Referring initially to FIG. 7, this flowchart describes several sample operations that may be performed by an apparatus to conduct a beam pattern search and update a beam pattern table.

As represented by block 702, at some point in time (e.g., periodically), the apparatus monitors at least one characteristic associated with use of a first beam pattern specified for beamformed communication by a beam pattern table. For example, the apparatus may keep track of a characteristic associated with the currently used beam pattern by comparing that characteristic with a corresponding threshold or some other parameter.

In some implementations, the at least one characteristic comprises received signal quality information associated with signal transmissions that are beamformed according to the first beam pattern. For example, the apparatus may receive this information from a peer apparatus that receives the communication.

In some implementations, the at least one characteristic comprises timing information associated with at least one beam pattern weight entry in the beam pattern table. For example, the timing information may indicate the time at which the beam pattern weight was entered into the table. Thus, the timing information may indicate the age of the weight entry. As another example, the timing information may indicate the time at which signal quality information associated with the beam pattern entry was entered into the table. Thus, the timing information may indicate the age of the signal quality entry.

As represented by block 704, as a result of the monitoring of block 702, a beam pattern search is conducted. In some aspects, the beam pattern search comprises successively communicating using different beam patterns (e.g., R1, R2, R3, etc., as discussed above).

The beam pattern search may be triggered in various ways. In some implementations, the beam pattern search is invoked as a result of a drop in monitored signal quality. This aspect is discussed in more detail below in conjunction with FIG. 8.

In some implementations, the beam pattern search is invoked when the current beam entry is too old. For example, a timestamp indicative of when the AWV was last updated may be compared to the current time. If this time duration equals or exceeds a threshold time period (thereby indicating that the AWV entry is too old and, hence, may no longer be the best AWV), a beam pattern search may be invoked in an attempt to find a better AWV.

In some implementations, the beam pattern search is invoked if the monitoring indicates a change in a modulation and coding scheme (MCS) used for the beamformed communication. For example, an abrupt change in received signal quality (e.g., an abrupt change in RSSI due to deterioration of the current beam) may trigger a switch from the use of a current MCS table to another MCS table for future beamformed communication. In such a case, upon determining that there has been a change in the MCS table (which may be indicative of beam deterioration), it may be desirable to invoke a beam pattern search to find a better beam.

As represented by block 706, as a result of the beam pattern search, one of the different beam patterns (used at block 704) that is associated with highest signal quality is identified. For example, the beam pattern that resulted in the highest received signal strength indication (RSSI) may be selected here.

As represented by block 708, the beam pattern table is updated to specify the identified beam pattern for subsequent beamformed communication instead of the first beam pattern. For example, the prior AWV, signal quality, and timestamp entries in the beam pattern table entry are replaced with new AWV, signal quality, and timestamp information corresponding to the beam pattern identified at block 706.

To further explain the above operations, a more specific example of an adaptive beam tracking procedure follows. Initially, a station transmits a data frame and receives an ACK frame using a selected beam. Typically, this step involves the use of a refined beam since this type of beam generally provides the best gain.

In a PLCP header of the ACK frame there is a Last RSSI field that indicates the RSSI of the data frame. Dropping of the RSSI indicates degradation of the selected beam, which in turn indicates that beam tracking is needed.

In this case, a beam tracking protocol is invoked. This beam tracking protocol is piggybacked with the next data frame transmission. Here, the data frame is still sent with the selected beam. In addition, a number of other beam options are tested using the appended training fields. The station chooses "other beams" for testing using a beam search algorithm. One type of search algorithm comprises a neighbor beam search (e.g., search R2 and R4 if R3 is the current beam). Another type of search algorithm comprises a neighbor's neighbor beam search (e.g., search R1 and R5 if R3 is the current beam).

In any event, the use of the beam tracking protocol may, in some cases, identify a better beam for the next data frame transmission. Consequently, after the beam tracking protocol procedures are performed, a new beam selection may be made. In this case, the beam selection table is updated. If the updated beam selection is a refined beam, updating of this beam may trigger a corresponding change of beam selection at the sector level (e.g., when the new refined beam is in a different sector from the prior refined beam).

As discussed above, signal quality information may take a variety of forms. In some implementations, SNR values are obtained (e.g., calculated by a receiving station and sent back to the transmitting station). If an SNR value is not available, an RSSI value may be obtained from the ACK frame for the next data frame transmission.

In the event blocking occurs, the signal quality value (e.g., SNR, RSSI, etc.) for the selected beam will remain low. In this case, the station may invoke sector level beam tracking. Sector level beam tracking uses sector level beams in the training fields. The data frame transmission carrying these training fields may use the selected beam at the sector level, instead of refined beam level.

Figure 8:
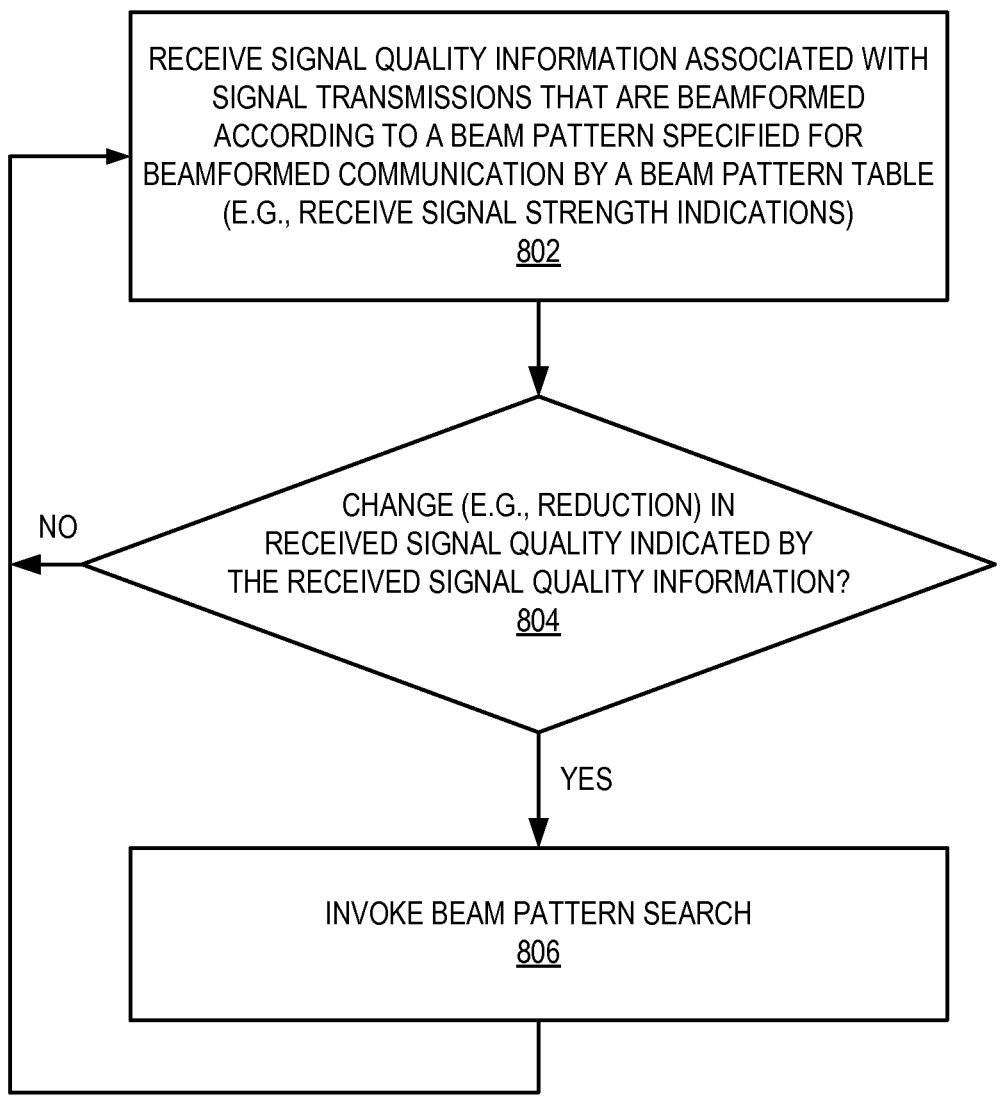
FIG. 8 is a flowchart of several sample aspects of operations performed in conjunction with invoking a beam pattern search.

Referring now to FIG. 8, in some implementations, the at least one characteristic referred to above comprises signal quality information. FIG. 8 describes several sample operations that may be performed by an apparatus that invokes a beam pattern search if there is a change in received signal quality associated with a current beam pattern.

As represented by block 802, at some point in time, the apparatus receives signal quality information associated with signal transmissions that are beamformed according to a beam pattern specified for beamformed communication by a beam pattern table (e.g., the first beam pattern referenced in block 702 of FIG. 7). For example, as a result of transmitting a beam using the current beam pattern specified by the table, the apparatus may obtain a received signal strength indication from a peer apparatus as discussed herein.

As represented by block 804, a determination is made as to whether a change (e.g., a reduction) in the received signal quality (e.g., received signal strength) is indicated by the received signal quality information (e.g., RSSI). For example, the current received signal quality value may be compared to the corresponding received signal quality value stored in the beam pattern table (e.g., in FIG. 5, SQ1 for a sector level transmission to STA 1).

As represented by block 806, a beam pattern search may be invoked based on the determination of block 804. For example, if the received signal quality is less than the signal quality from the table by a defined amount (e.g., a hysteresis margin) for a certain amount of time (e.g., a threshold time period), a beam pattern search may be invoked.

Conversely, if there has not been a significant (or any) change in the received signal quality at block 804, the operational flow proceeds back to block 802 to continue receiving signal quality information (e.g. periodically). Similarly, after the beam pattern search is conducted (and the beam pattern table updated, if applicable) at block 806, the operational flow proceeds back to block 802 to continue receiving signal quality information.

Figure 9:
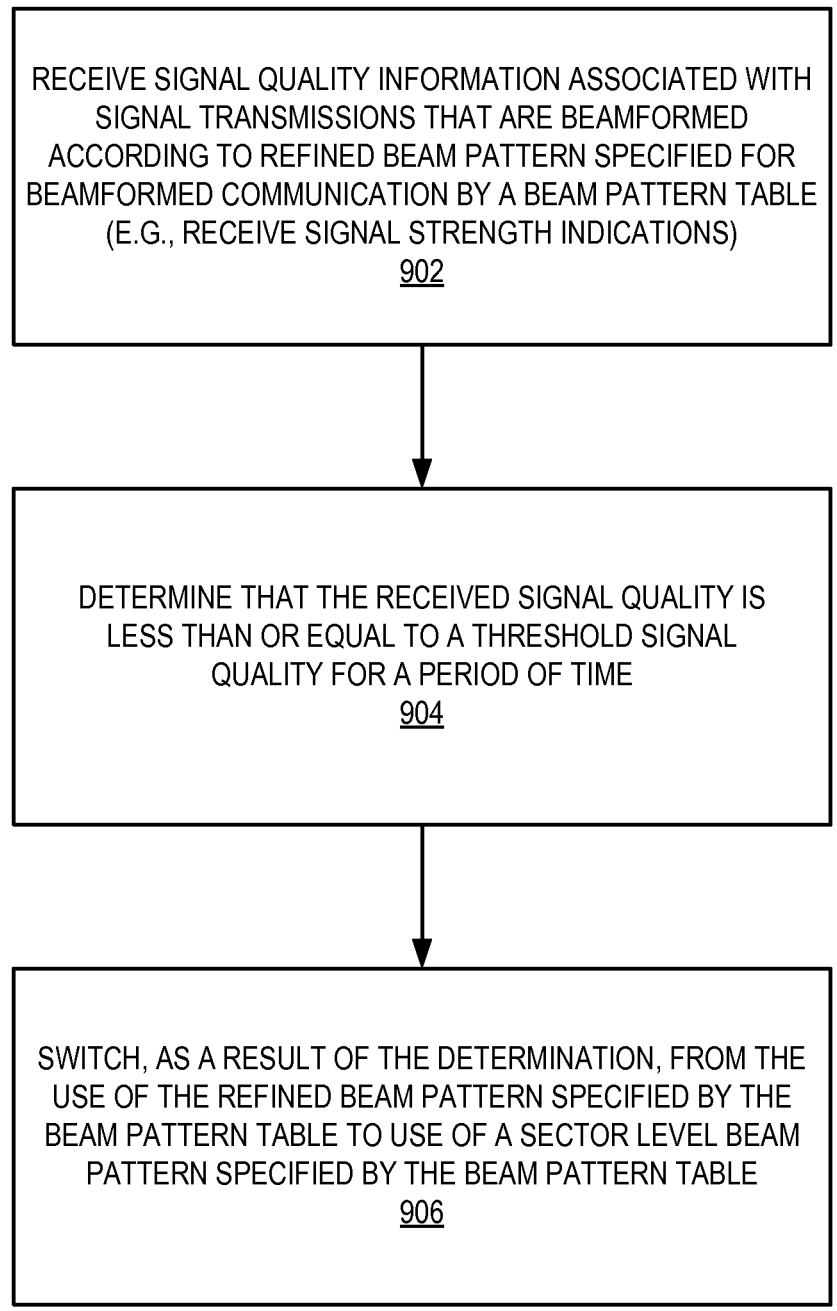
FIG. 9 is a flowchart of several sample aspects of operations performed in conjunction with switching beam patterns.

Referring to FIG. 9, in some implementations, an apparatus reverts back to a sector level beam in the event the signal quality associated with a refined beam is too low for too long. Thus, similar to FIG. 8, the flow chart of FIG. 9 refers to a case where the at least one characteristic referred to above comprises signal quality information.

As represented by block 902, the apparatus receives signal quality information associated with signal transmissions that are beamformed according to a refined beam pattern specified for beamformed communication by a beam pattern table (e.g., the first beam pattern referenced in block 702 of FIG. 7). Thus, in some aspects, the operations of block 902 may correspond to the operations of block 802 of FIG. 8. In the case of FIG. 9, the identified beam pattern comprises a refined beam pattern (e.g., having a first nominal beam width as discussed herein).

As represented by block 904, a determination is made as to whether the received signal quality is less than or equal to a threshold signal quality for a period of time.

As represented by block 906, as a result of the determination of block 904, the apparatus switches from the use of the identified beam pattern specified by the beam pattern table to use of a sector beam pattern specified by the beam pattern table. As discussed herein, the sector beam pattern has a second nominal beam width that is wider than the first nominal beam width. Thus, at block 906, if the received signal quality is less than or equal to the threshold value for a period of time that is equal to or greater than a threshold time period, the apparatus switches from the current refined beam pattern to a wider sector level beam pattern.

Figure 10:
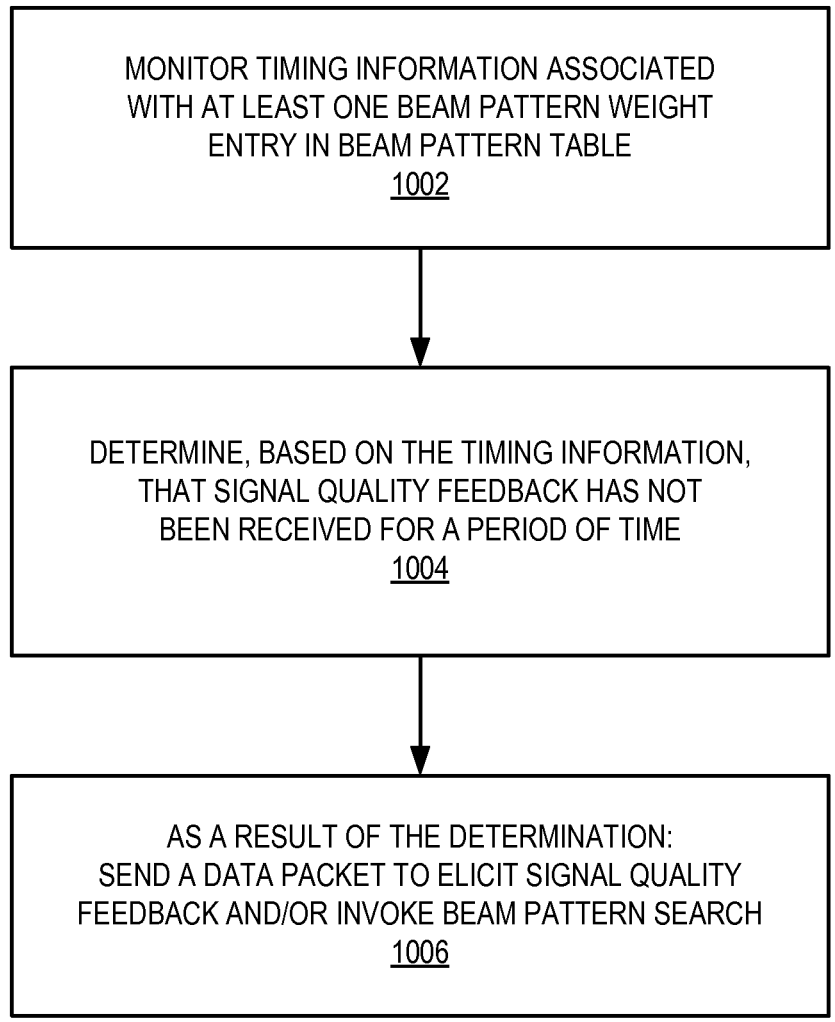
FIG. 10 is a flowchart of several sample aspects of operations performed in conjunction with eliciting signal quality feedback and/or invoking a beam pattern search.

Referring to FIG. 10, in some implementations, the at least one characteristic referred to above comprises timing information. In some cases, this timing information is used to determine whether to obtain more up-to-date signal quality information. In some cases, this timing information is used to determine whether to invoke a beam pattern search.

As represented by block 1002, the apparatus monitors timing information associated with at least one beam pattern weight entry in the beam pattern table (e.g., for the current beam pattern of interest). For example, the apparatus may periodically read the timing information (e.g., a timestamp associated with the signal quality information) and compare it to the current time.

As represented by block 1004, based on the timing information from block 1002, a determination is made as to whether signal quality feedback has been received for a period of time. For example, the difference between the current time and a timestamp value from the table may be compared to a threshold.

As represented by block 1006, as a result of the determination of block 1004, a data packet may be sent to elicit signal quality feedback and/or a beam pattern search may be invoked. For example, upon determining that the signal quality information stored in the table is too old (e.g., the threshold is met or exceeded at block 1004), the apparatus may send data (e.g., a data frame) to a peer apparatus to cause the peer apparatus to send feedback (e.g., an ACK). In addition or alternatively, the apparatus may invoke a beam pattern search (e.g., to obtain current information for several beams).

Figure 11:
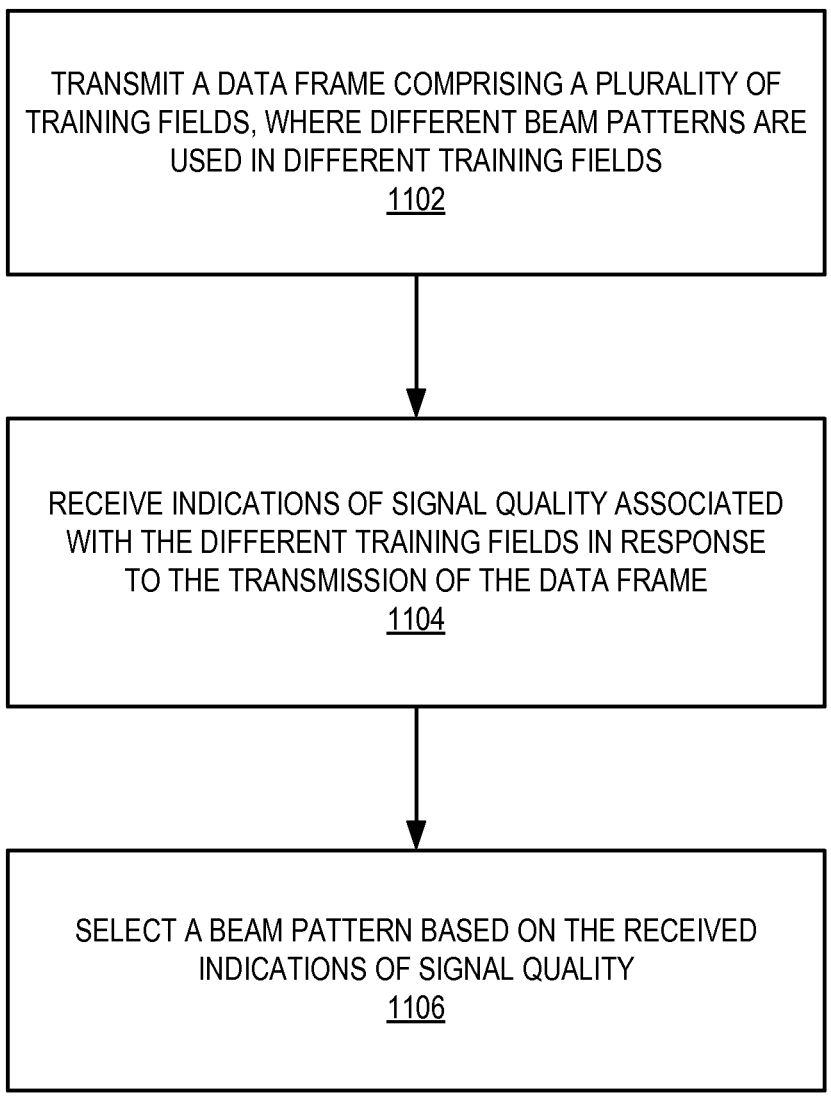
FIG. 11 is a flowchart of several sample aspects of operations performed in conjunction with selecting a beam pattern.

Referring to FIG. 11, as discussed above, in some implementations a beam pattern search is performed through the use of a data frame that comprises a plurality of training fields.

As represented by block 1102, the apparatus transmits a data frame comprising a plurality of training fields. As discussed herein, different beam patterns are used in corresponding different ones of the training fields.

As represented by block 1104, in response to transmitting the data frame at block 1102, the apparatus receives different indications of signal quality associated with the different training fields. For example, this information may be received via an ACK frame.

As represented by block 1106, a new beam pattern is selected based on the received indications of signal quality, if applicable. For example, if one of the tested beam patterns is associated with a higher RSSI than the current beam pattern, the beam pattern with the highest RSSI is selected as the new beam pattern.

Figure 12:
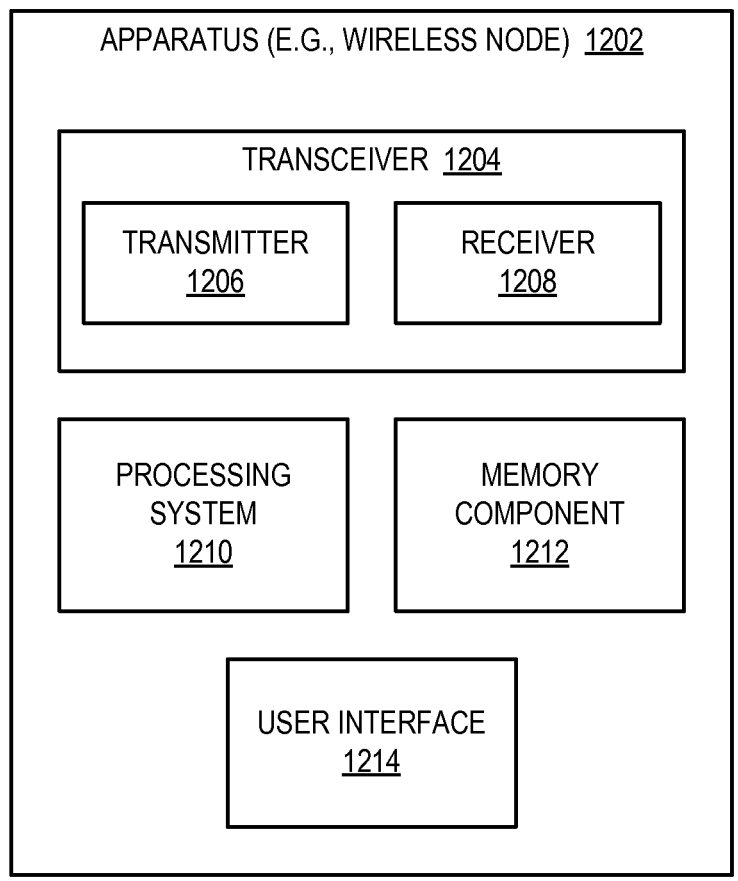
FIG. 12 is a simplified block diagram of several sample aspects of components that may be employed in communication nodes.

FIG. 12 illustrates several sample components (represented by corresponding blocks) that may be incorporated into an apparatus 1202 (e.g., corresponding to the apparatuses 102 and 104 of FIG. 1) to perform beamforming-related operations as taught herein. In a typical implementation, the apparatus 1202 comprises a wireless node (e.g., a peer-to-peer station, an access point, and access terminal, etc.). It should be appreciated that these components may be implemented in different types of apparatuses in different implementations (e.g., in an ASIC, in a system on a chip (SoC), etc.). The described components also may be incorporated into other nodes in a communication system. For example, other nodes in a system may include components similar to those described for the apparatus 1202 to provide similar functionality. Also, a given node may contain one or more of the described components. For example, an apparatus may include multiple transceiver components that enable the apparatus to operate on multiple carriers and/or communicate via different technologies.

As shown in FIG. 12, the apparatus 1202 includes one or more transceivers (as represented by a transceiver 1204) for communicating with other nodes. Each transceiver 1204 includes a transmitter 1206 for sending signals (e.g., transmitting signals comprising frames, packets, etc.) and a receiver 1208 for receiving corresponding signals. In some implementations, the transceiver 1204 performs one or more of: conducting a beam pattern search, wherein the beam pattern search comprises successively communicating using different beam patterns; or sending a data packet to elicit signal quality feedback.

The apparatus 1202 also includes other components that are used in conjunction with beamforming-related operations as taught herein. The apparatus 1202 includes a processing system 1210 for processing received signals and/or signals to be transmitted, and for providing other related functionality as taught herein. For example, in some implementations the processing system performs one or more of: monitoring at least one characteristic associated with use of a first beam pattern specified for beamformed communication by a beam pattern table; identifying, as a result of a beam pattern search, one of the different beam patterns that is associated with highest signal quality; updating the beam pattern table to specify the identified beam pattern for subsequent beamformed communication instead of the first beam pattern; determining that the received signal quality is less than or equal to a threshold signal quality for a period of time; switching, as a result of the determination, from the use of the identified beam pattern specified by the beam pattern table to use of a sector beam pattern specified by the beam pattern table, wherein the sector beam pattern has a second nominal beam width that is wider than the first nominal beam width; or determining, based on the timing information, that signal quality feedback has not been received for a period of time. In some implementations, operations described herein as being performed by the processing system 1210 may instead be performed, at least in part, by the transceiver 1204, and vice versa. The apparatus 1202 includes a memory component 1212 (e.g., including a memory device) for maintaining information (e.g., a beam pattern table). The apparatus 1202 also includes a user interface 1214 for providing indications (e.g., audible and/or visual indications) to a user and/or for receiving user input (e.g., upon user actuation of a sensing device such a microphone, a camera, a keypad, and so on).

The components of FIG. 12 may be implemented in various ways. In some implementations the components of FIG. 12 are implemented in one or more circuits such as, for example, one or more processing systems and/or one or more ASICs (which may include one or more processing systems). Here, each circuit (e.g., processing system) may use and/or incorporate memory for storing information or executable code used by the circuit to provide this functionality. For example, some of the functionality represented by block 1204 and some or all of the functionality represented by blocks 1210-1214 may be implemented by a processing system of an apparatus and memory of the apparatus (e.g., by execution of appropriate code and/or by appropriate configuration of processing system components).

Figure 13:
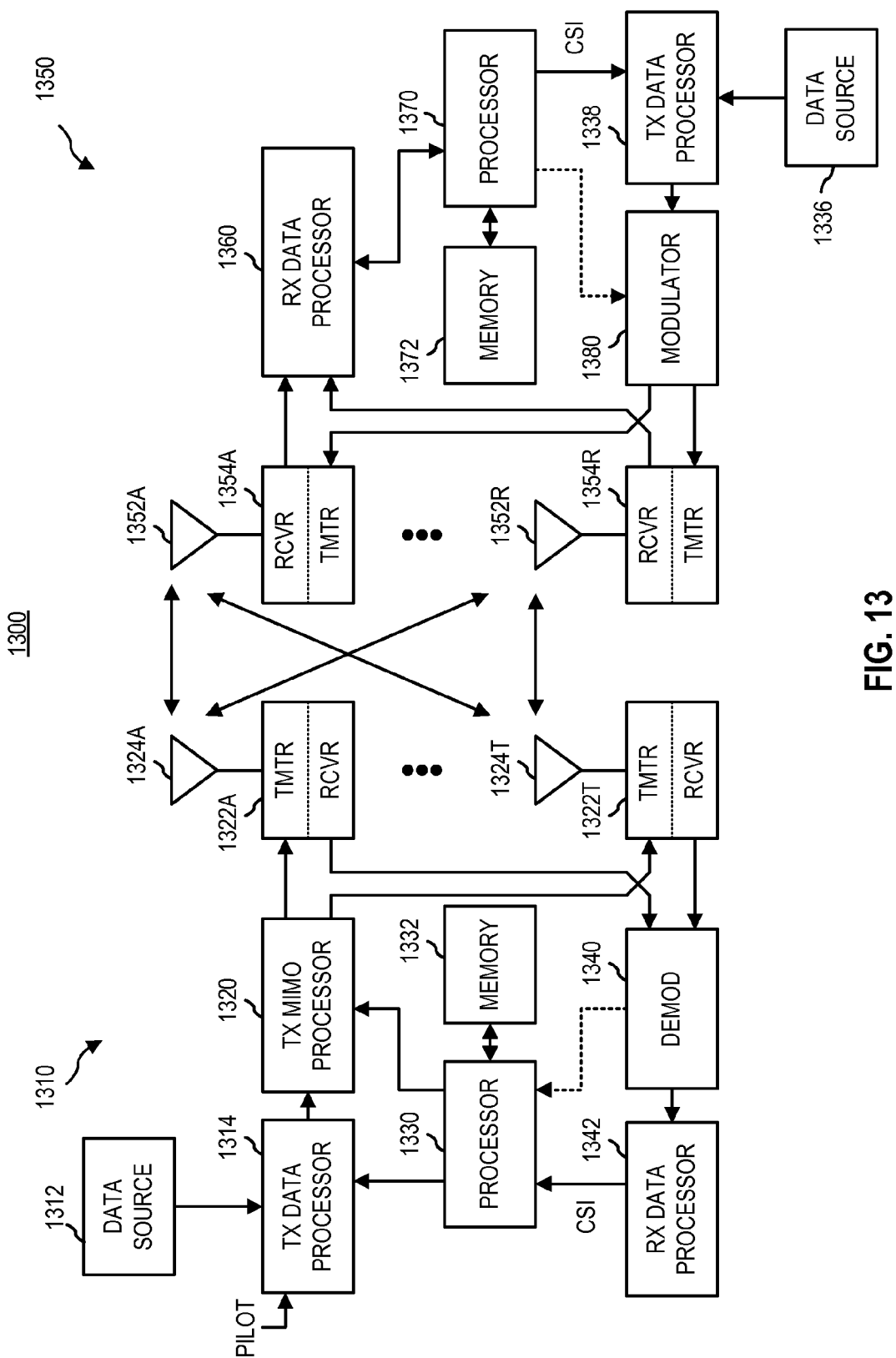
FIG. 13 is a simplified block diagram of several sample aspects of communication components.

FIG. 13 illustrates in more detail sample components that may be employed in a pair of wireless nodes of a MIMO system 1300. In this example, the wireless nodes are labeled as a wireless device 1310 (e.g., an access point) and a wireless device 1350 (e.g., an access terminal). It should be appreciated that a MU-MIMO system will include other devices (e.g., access terminals) similar to the wireless device 1350. To reduce the complexity of FIG. 13, however, only one such device is shown.

The MIMO system 1300 employs multiple ($N_T$) transmit antennas and multiple ($N_R$) receive antennas for data transmission. A MIMO channel formed by the $N_T$ transmit and $N_R$ receive antennas is decomposed into $N_S$ independent channels, which are also referred to as spatial channels, where $N_S \leq \min\{N_T, N_R\}$.

The MIMO system 1300 supports time division duplex (TDD) and/or frequency division duplex (FDD). In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Referring initially to the device 1310, traffic data for a number of data streams is provided from a data source 1312 to a transmit (TX) data processor 1314. Each data stream is then transmitted over a respective transmit antenna.

The TX data processor 1314 formats, codes, and interleaves the traffic data for each data stream based on a particular coding scheme selected for that data stream to provide coded data. The coded data for each data stream is multiplexed with pilot data using OFDM techniques or other suitable techniques. The pilot data is typically a known data pattern that is processed in a known manner and used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream are typically determined by instructions performed by a processor 1330. A memory 1332 stores program code, data, and other information used by the processor 1330 or other components of the device 1310.

The modulation symbols for all data streams are then provided to a TX MIMO processor 1320, which further processes the modulation symbols (e.g., for OFDM). The TX MIMO processor 1320 then provides $N_T$ modulation symbol streams to $N_T$ transceivers (XCVR) 1322A through 1322T. In some aspects, the TX MIMO processor 1320 applies beamforming weights to the symbols of the data streams and to the antenna from which the symbol is being transmitted.

Each transceiver 1322 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1322A through 1322T are then transmitted from $N_T$ antennas 1324A through 1324T, respectively.

At the device 1350, the transmitted modulated signals are received by $N_R$ antennas 1352A through 1352R and the received signal from each antenna 1352 is provided to a respective transceiver (XCVR) 1354A through 1354R. Each transceiver 1354 conditions (e.g., filters, amplifies, and downconverts) a respective received signal, digitizes the conditioned signal to provide samples, and further processes the samples to provide a corresponding "received" symbol stream.

A receive (RX) data processor 1360 then receives and processes the $N_R$ received symbol streams from $N_R$ transceivers 1354 based on a particular receiver processing technique to provide $N_T$ "detected" symbol streams. The RX data processor 1360 then demodulates, deinterleaves, and decodes each detected symbol stream to recover the traffic data for the data stream. The processing by the RX data processor 1360 is complementary to that performed by the TX MIMO processor 1320 and the TX data processor 1314 at the device 1310.

A processor 1370 periodically determines which precoding matrix to use (discussed below). The processor 1370 formulates a reverse link message comprising a matrix index portion and a rank value portion. A memory 1372 stores program code, data, and other information used by the processor 1370 or other components of the device 1350.

The reverse link message comprises various types of information regarding the communication link and/or the received data stream. The reverse link message is processed by a TX data processor 1338, which also receives traffic data for a number of data streams from a data source 1336, modulated by a modulator 1380, conditioned by the transceivers 1354A through 1354R, and transmitted back to the device 1310.

At the device 1310, the modulated signals from the device 1350 are received by the antennas 1324, conditioned by the transceivers 1322, demodulated by a demodulator (DEMOD) 1340, and processed by a RX data processor 1342 to extract the reverse link message transmitted by the device 1350. The processor 1330 then determines which precoding matrix to use for determining the beamforming weights by processing the extracted message.

In some implementations, one or more of the processors 1330, 1314, 1320, 1338, 1342, 1360, or 1370 perform one or more of the beamforming-related operations described herein. It should be appreciated that these operations may be performed in cooperation with other components of FIG. 13 and/or by other components of FIG. 13 in some implementations.

An apparatus may include various components that perform functions based on signals that are transmitted by or received at the wireless node. For example, in some implementations, an apparatus comprises a user interface configured to output an indication based on a signal that is received through the use of beamforming as taught herein. In some implementations, an apparatus comprises a receiver configured to receive a signal (e.g., message) through the use of beamforming as taught herein.

The teachings herein may be incorporated into (e.g., implemented within or performed by) a variety of apparatuses (e.g., devices). For example, one or more aspects taught herein may be employed for cable replacement (e.g., HDMI cable replacement), wireless docking, media content hosting (e.g., via a video player), media kiosk applications, Mobile Internet applications, media distribution, and so on. Accordingly, one or more aspects taught herein may be incorporated into a computer, a monitor, a phone (e.g., a cellular phone), a tablet device, a portable entertainment device, a home entertainment device, a set-top box, a gaming device, a user I/O device, a point-of-sale device, a kiosk, or any other suitable device. There are other multitudes of applications that may incorporate any aspect of the disclosure as described herein.

The teachings herein may be incorporated into (e.g., implemented within or performed by) a variety of apparatuses. In some aspects, an apparatus implemented in accordance with the teachings herein may comprise a wireless node such as an access point or an access terminal.

A wireless node as taught herein may communicate via one or more wireless communication links that are based on or otherwise support any suitable wireless communication technology. For example, in some aspects a wireless node may associate with a network such as a local area network or a wide area network. To this end, a wireless node may support or otherwise use one or more of a variety of wireless communication technologies, protocols, or standards such as, for example, Wi-Fi, WiMAX, CDMA, TDMA, OFDM, and OFDMA. Also, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

An access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects a wireless node comprises an access device (e.g., an access point) for a communication system. Such an access device provides, for example, connectivity to another network (e.g., a wide area network such as the Internet or a cellular network) via a wired or wireless communication link.

Accordingly, the access device enables another device (e.g., a wireless station) to access the other network or some other functionality. In addition, it should be appreciated that one or both of the devices may be portable or, in some cases, relatively non-portable. Also, it should be appreciated that a wireless node also may be capable of transmitting and/or receiving information in a non-wireless manner (e.g., via a wired connection) via an appropriate communication interface.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Re199, Re15, Re16, Re17) technology, as well as 3GPP2 (e.g., 1×RTT, 1×EV-DO Re10, RevA, RevB) technology and other technologies.

Figure 14:
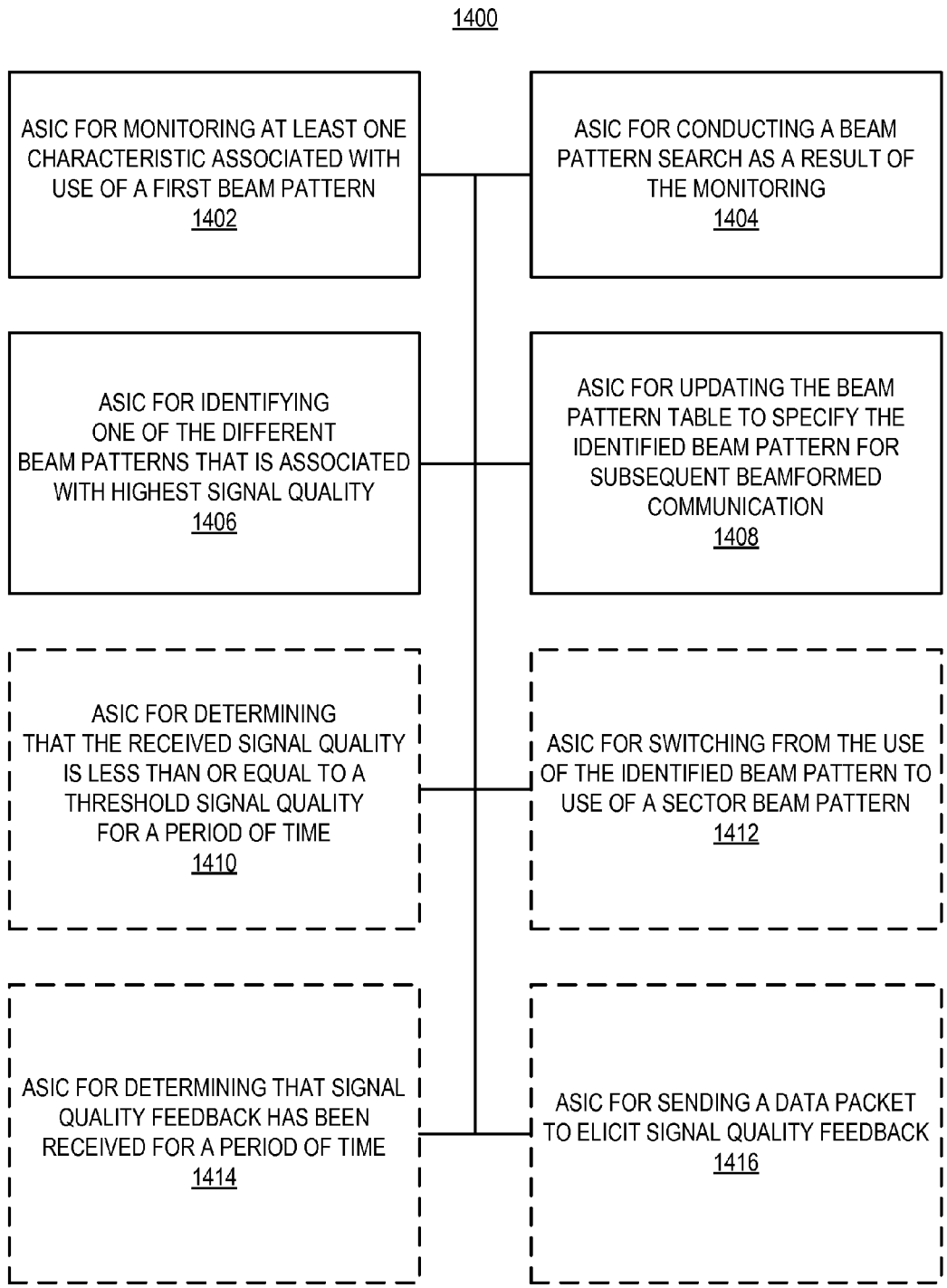
FIG. 14 is a simplified block diagram of several sample aspects of an apparatus configured to update a beam pattern table as taught herein.

The components described herein may be implemented in a variety of ways. Referring to FIG. 14, an apparatus 1400 is represented as a series of interrelated functional components that represent functions implemented by, for example, one or more integrated circuits (e.g., an ASIC) or implemented in some other manner as taught herein. As discussed herein, an integrated circuit may include a processor, software, other components, or some combination thereof. In some aspects one or more of any components represented by dashed boxes are optional.

The apparatus 1400 includes one or more modules that perform one or more of the functions described above with regard to various figures. An ASIC for monitoring at least one characteristic associated with use of a first beam pattern 1402 may correspond to, for example, a processing system as discussed herein. An ASIC for conducting a beam pattern search as a result of the monitoring 1404 may correspond to, for example, a transceiver as discussed herein. An ASIC for identifying one of the different beam patterns that is associated with highest signal quality 1406 may correspond to, for example, a processing system as discussed herein. An ASIC for updating the beam pattern table to specify the identified beam pattern for subsequent beamformed communication 1408 may correspond to, for example, a processing system as discussed herein. An ASIC for determining that the received signal quality is less than or equal to a threshold signal quality for a period of time 1410 may correspond to, for example, a processing system as discussed herein. An ASIC for switching from the use of the identified beam pattern to use of a sector beam pattern 1412 may correspond to, for example, a processing system as discussed herein. An ASIC for determining that signal quality feedback has not been received for a period of time 1414 may correspond to, for example, a processing system as discussed herein. An ASIC for sending a data packet to elicit signal quality feedback 1416 may correspond to, for example, a transceiver as discussed herein.

In some aspects, at least one processor may be configured to implement a portion or all of the functionality of one or more of the above components of the apparatus 1400. Thus, the functionality of different components may be implemented, for example, as different subsets of an integrated circuit, as different subsets of a set of software modules, or a combination thereof. Also, it should be appreciated that a given subset (e.g., of an integrated circuit and/or of a set of software modules) may provide at least a portion of the functionality for more than one component.

The apparatus 1400 may comprise one or more integrated circuits in some implementations. For example, in some aspects a single integrated circuit implements the functionality of one or more of the illustrated components, while in other aspects more than one integrated circuit implements the functionality of one or more of the illustrated components.

The components and functions represented by FIG. 14 as well as other components and functions described herein, may be implemented using any suitable means. Such means are implemented, at least in part, using corresponding structure as taught herein. For example, the components described above in conjunction with the "ASIC for" components of FIG. 14 correspond to similarly designated "means for" functionality. Thus, one or more of such means may be implemented using one or more of processor components, integrated circuits, or other suitable structure as taught herein in some implementations. Several examples follow. In some aspects, means for monitoring at least one characteristic associated with use of a first beam pattern comprises a processing system. In some aspects, means for conducting a beam pattern search as a result of the monitoring comprises a transceiver. In some aspects, means for identifying one of the different beam patterns that is associated with highest signal quality comprises a processing system. In some aspects, means for updating the beam pattern table to specify the identified beam pattern for subsequent beamformed communication comprises a processing system. In some aspects, means for determining that the received signal quality is less than or equal to a threshold signal quality for a period of time comprises a processing system. In some aspects, means for switching from the use of the identified beam pattern to use of a sector beam pattern comprises a processing system. In some aspects, means for determining that signal quality feedback has not been received for a period of time comprises a processing system. In some aspects, means for sending a data packet to elicit signal quality feedback comprises a transceiver.

In some aspects, an apparatus or any component of an apparatus may be configured to provide functionality as taught herein by, for example, manufacturing (e.g., fabricating) the apparatus or component so that it will provide the functionality, by programming the apparatus or component so that it will provide the functionality, or through the use of some other suitable configuring means.

Also, it should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

Those of skill in the art understand that information and signals may be represented using any of a variety of different technologies and techniques. For example, any data, instructions, commands, information, signals, bits, symbols, and chips referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by a processing system, an integrated circuit ("IC"), an access terminal, or an access point. A processing system may be implemented using one or more ICs or may be implemented within an IC (e.g., as part of a system on a chip). An IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes (e.g., executable by at least one computer) relating to one or more of the aspects of the disclosure. In some aspects a computer program product may comprise packaging materials.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A computer-readable media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer-readable medium (e.g., tangible media, computer-readable storage medium, etc.). In addition, in some aspects computer-readable medium may comprise transitory computer readable medium (e.g., comprising a signal). Combinations of the above should also be included within the scope of computer-readable media. It should be appreciated that a computer-readable medium may be implemented in any suitable computer-program product.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. An apparatus for wireless communication, comprising:
   a processing system configured to monitor at least one characteristic associated with use of a first beam pattern specified for beamformed communication by a beam pattern table, wherein the at least one characteristic comprises timing information that is indicative of aging of a plurality of beam pattern weight entries in the beam pattern table, wherein the beam pattern weight entries comprise an antenna weight vector and received signal quality information associated with signal transmissions that are beamformed according to the first beam pattern, and wherein the processing system is further configured to invoke a beam pattern search if the timing information indicates that a period of time since at least one of the beam pattern weight entries was last updated is greater than or equal to a threshold time period; and
   a transceiver configured to conduct the beam pattern search, wherein, to conduct the beam pattern search, the transceiver is further configured to successively communicate using different beam patterns;
   wherein the processing system is further configured to:
      identify, as a result of the beam pattern search, one of the different beam patterns that is associated with highest signal quality, and
      update the beam pattern table to specify the identified beam pattern for subsequent beamformed communication instead of the first beam pattern.

2. The apparatus of claim 1, wherein:
to monitor the at least one characteristic, the processing system is further configured to receive signal strength indications from another apparatus that receives signals beamformed according to the first beam pattern; and
the beam pattern search is invoked if a change in received signal strength is indicated by the received signal strength indications.

3. The apparatus of claim 2, wherein the change in received signal strength comprises a reduction in received signal strength.

4. The apparatus of claim 1, wherein:
the processing system is further configured to determine, based on the timing information, that signal quality feedback has not been received for a period of time; and
the transceiver is further configured to send a data packet, as a result of the determination, to elicit signal quality feedback.

5. The apparatus of claim 1, wherein:
to communicate using different beam patterns, the transceiver is further configured to transmit a data frame comprising a plurality of training fields;
different ones of the beam patterns are used in corresponding different ones of the training fields;
different indications of signal quality associated with the different training fields are received in response to the transmission of the data frame; and
the identified beam pattern is selected based on the received indications of signal quality.

6. The apparatus of claim 1, wherein the processing system is further configured to invoke the beam pattern search if the monitor of at least one characteristic triggers a change in a modulation and coding scheme used for the beamformed communication.

7. The apparatus of claim 1, wherein the beam pattern table comprises different beam pattern weights associated with different IEEE 802.11ad stations.

8. The apparatus of claim 1, wherein:
the first beam pattern has a first nominal beam width; and
the identified beam pattern has a second nominal beam width that is wider than the first nominal beam width.

9. The apparatus of claim 1, wherein the processing system is further configured to:
periodically monitor the timing information to determine whether to update the received signal quality information.

10. The apparatus of claim 1, wherein the processing system is further configured to:
maintain beam pattern weight entries for each of a plurality of other apparatuses; and
periodically monitor the beam pattern weight entries for a particular one of the other apparatuses to determine whether to invoke a beam pattern search for the particular one of the other apparatuses.

11. An apparatus for wireless communication, comprising:
   a processing system configured to monitor at least one characteristic associated with use of a first beam pattern specified for beamformed communication by a beam pattern table, wherein the at least one characteristic comprises received signal quality; and
   a transceiver configured to conduct a beam pattern search as a result of the monitoring, wherein, to conduct the beam pattern search, the transceiver is further configured to successively communicate using different beam patterns;
   wherein the processing system is further configured to:
      identify, as a result of the beam pattern search, one of the different beam patterns that is associated with highest signal quality, wherein the identified beam pattern comprises a refined beam pattern having a first nominal beam width, update the beam pattern table to specify the identified beam pattern for subsequent beamformed communication instead of the first beam pattern, determine that the received signal quality is less than or equal to a threshold signal quality for a period of time, and switch, as a result of the determination, from the use of the identified beam pattern specified by the beam pattern table to use of a sector beam pattern specified by the beam pattern table, wherein the sector beam pattern has a second nominal beam width that is wider than the first nominal beam width.

12. A method of wireless communication, comprising:

monitoring at least one characteristic associated with use of a first beam pattern specified for beamformed communication by a beam pattern table, wherein the at least one characteristic comprises timing information that is indicative of aging of a plurality of beam pattern weight entries in the beam pattern table, and wherein the beam pattern weight entries comprise an antenna weight vector and received signal quality information associated with signal transmissions that are beamformed according to the first beam pattern;

invoking a beam pattern search if the timing information indicates that a period of time since the at least one beam pattern weight entry was last updated is greater than or equal to a threshold time period;

conducting the beam pattern search, wherein the beam pattern search comprises successively communicating using different beam patterns;

identifying, as a result of the beam pattern search, one of the different beam patterns that is associated with highest signal quality; and updating the beam pattern table to specify the identified beam pattern for subsequent beamformed communication instead of the first beam pattern.

13. The method of claim 12, wherein:

the monitoring of the at least one characteristic comprises receiving signal strength indications from an apparatus that receives signals beamformed according to the first beam pattern; and the beam pattern search is invoked if a change in received signal strength is indicated by the received signal strength indications.

14. The method of claim 13, wherein the change in received signal strength comprises a reduction in received signal strength.

15. The method of claim 12, further comprising:

determining, based on the timing information, that signal quality feedback has not been received for a period of time; and sending a data packet, as a result of the determination, to elicit signal quality feedback.

16. The method of claim 12, wherein:

the communication using different beam patterns comprises transmitting a data frame comprising a plurality of training fields;

different ones of the beam patterns are used in corresponding different ones of the training fields;

different indications of signal quality associated with the different training fields are received in response to the transmission of the data frame; and the identified beam pattern is selected based on the received indications of signal quality.

17. The method of claim 12, wherein the beam pattern search is invoked if the monitoring triggers a change in a modulation and coding scheme used for the beamformed communication.

18. The method of claim 12, wherein the beam pattern table comprises different beam pattern weights associated with different IEEE 802.11ad stations.

19. The method of claim 12, wherein:

the first beam pattern has a first nominal beam width; and the identified beam pattern has a second nominal beam width that is wider than the first nominal beam width.

20. A method of wireless communication, comprising:

monitoring at least one characteristic associated with use of a first beam pattern specified for beamformed communication by a beam pattern table, wherein the at least one characteristic comprises received signal quality;

conducting a beam pattern search as a result of the monitoring, wherein the beam pattern search comprises successively communicating using different beam patterns;

identifying, as a result of the beam pattern search, one of the different beam patterns that is associated with highest signal quality, wherein the identified beam pattern comprises a refined beam pattern having a first nominal beam width;

updating the beam pattern table to specify the identified beam pattern for subsequent beamformed communication instead of the first beam pattern;

determining that the received signal quality is less than or equal to a threshold signal quality for a period of time; and switching, as a result of the determination, from the use of the identified beam pattern specified by the beam pattern table to use of a sector beam pattern specified by the beam pattern table, wherein the sector beam pattern has a second nominal beam width that is wider than the first nominal beam width.

21. An apparatus for wireless communication, comprising:

means for monitoring at least one characteristic associated with use of a first beam pattern specified for beamformed communication by a beam pattern table, wherein the at least one characteristic comprises timing information that is indicative of aging of a plurality of beam pattern weight entries in the beam pattern table, wherein the beam pattern weight entries comprise an antenna weight vector and received signal quality information associated with signal transmissions that are beamformed according to the first beam pattern, and wherein the means for monitoring is configured to invoke a beam pattern search if the timing information indicates that a period of time since the at least one beam pattern weight entry was last updated is greater than or equal to a threshold time period;

means for conducting the beam pattern search, wherein the beam pattern search comprises successively communicating using different beam patterns;

means for identifying, as a result of the beam pattern search, one of the different beam patterns that is associated with highest signal quality; and means for updating the beam pattern table to specify the identified beam pattern for subsequent beamformed communication instead of the first beam pattern.

22. The apparatus of claim 21, wherein:

the monitoring of the at least one characteristic comprises receiving signal strength indications from another apparatus that receives signals beamformed according to the first beam pattern; and the beam pattern search is invoked if a change in received signal strength is indicated by the received signal strength indications.

23. The apparatus of claim 22, wherein the change in received signal strength comprises a reduction in received signal strength.

24. The apparatus of claim 21, further comprising:
means for determining, based on the timing information, that signal quality feedback has not been received for a period of time; and
means for sending a data packet, as a result of the determination, to elicit signal quality feedback.

25. The apparatus of claim 21, wherein:
the communication using different beam patterns comprises transmitting a data frame comprising a plurality of training fields;
different ones of the beam patterns are used in corresponding different ones of the training fields;
different indications of signal quality associated with the different training fields are received in response to the transmission of the data frame; and
the identified beam pattern is selected based on the received indications of signal quality.

26. The apparatus of claim 21, wherein the beam pattern search is invoked if the monitoring triggers a change in a modulation and coding scheme used for the beamformed communication.

27. The apparatus of claim 21, wherein the beam pattern table comprises different beam pattern weights associated with different IEEE 802.11ad stations.

28. The apparatus of claim 21, wherein:
the first beam pattern has a first nominal beam width; and
the identified beam pattern has a second nominal beam width that is wider than the first nominal beam width.

29. An apparatus for wireless communication, comprising:
means for monitoring at least one characteristic associated with use of a first beam pattern specified for beamformed communication by a beam pattern table, wherein the at least one characteristic comprises received signal quality;
means for conducting a beam pattern search as a result of the monitoring, wherein the beam pattern search comprises successively communicating using different beam patterns;
means for identifying, as a result of the beam pattern search, one of the different beam patterns that is associated with highest signal quality, wherein the identified beam pattern comprises a refined beam pattern having a first nominal beam width;
means for updating the beam pattern table to specify the identified beam pattern for subsequent beamformed communication instead of the first beam pattern;
means for determining that the received signal quality is less than or equal to a threshold signal quality for a period of time; and
means for switching, as a result of the determination, from the use of the identified beam pattern specified by the beam pattern table to use of a sector beam pattern specified by the beam pattern table, wherein the sector beam pattern has a second nominal beam width that is wider than the first nominal beam width.

30. A non-transitory computer-readable medium comprising codes executable to:
monitor at least one characteristic associated with use of a first beam pattern specified for beamformed communication by a beam pattern table, wherein the at least one characteristic comprises timing information that is indicative of aging of a plurality of beam pattern weight entries in the beam pattern table, and wherein the beam pattern weight entries comprise an antenna weight vector and received signal quality information associated with signal transmissions that are beamformed according to the first beam pattern;
invoke a beam pattern search if the timing information indicates that a period of time since the at least one beam pattern weight entry was last updated is greater than or equal to a threshold time period;
conduct the beam pattern search, wherein the beam pattern search comprises successively communicating using different beam patterns;
identify, as a result of the beam pattern search, one of the different beam patterns that is associated with highest signal quality; and
update the beam pattern table to specify the identified beam pattern for subsequent beamformed communication instead of the first beam pattern.

31. A wireless node, comprising:
an antenna system;
a processing system configured to monitor at least one characteristic associated with use of a first beam pattern specified for beamformed communication by a beam pattern table, wherein the at least one characteristic comprises timing information that is indicative of aging of a plurality of beam pattern weight entries in the beam pattern table, wherein the beam pattern weight entries comprise an antenna weight vector and received signal quality information associated with signal transmissions that are beamformed according to the first beam pattern, and wherein the processing system is further configured to invoke a beam pattern search if the timing information indicates that a period of time since the at least one beam pattern weight entry was last updated is greater than or equal to a threshold time period; and
a transceiver configured to conduct the beam pattern search, wherein, to conduct the beam pattern search, the transceiver is further configured to successively communicate using different beam patterns;
wherein the processing system is further configured to:
identify, as a result of the beam pattern search, one of the different beam patterns that is associated with highest signal quality, and
update the beam pattern table to specify the identified beam pattern for subsequent beamformed communication instead of the first beam pattern.

* * * * *